United States Patent [19]

Negro et al.

[11] 4,300,406
[45] Nov. 17, 1981

[54] APPARATUS FOR DRIVING A PLURALITY OF UNITS

[75] Inventors: Guido Negro; Reinhold Fitzel, both of Neuffen, Fed. Rep. of Germany

[73] Assignee: Bielomatik Leuze & Co., Fed. Rep. of Germany

[21] Appl. No.: 112,577

[22] Filed: Jan. 16, 1980

[30] Foreign Application Priority Data

Jan. 24, 1979 [DE] Fed. Rep. of Germany ....... 2902589

[51] Int. Cl.³ ...................... B42C 19/00; F16H 21/44
[52] U.S. Cl. ......................................... 74/54; 11/1 A; 29/564.1; 74/99 R; 74/107; 74/567
[58] Field of Search ..................... 74/53, 54, 55, 99 R, 74/107, 567; 11/1 A, 1 R; 29/564.1, 37 A

[56] References Cited

U.S. PATENT DOCUMENTS

| | | | |
|---|---|---|---|
| 2,550,850 | 5/1951 | Muller | 74/99 X |
| 2,851,898 | 9/1958 | Hasty | 74/567 X |
| 2,973,528 | 3/1961 | Renoux | 74/55 X |
| 3,257,660 | 6/1966 | Schneider | 74/567 X |
| 4,157,821 | 6/1979 | Fabrig | 11/1 A X |

FOREIGN PATENT DOCUMENTS

| | | | |
|---|---|---|---|
| 521124 | 7/1953 | Belgium . | |
| 164960 | 11/1905 | Fed. Rep. of Germany | 74/53 |
| 12345 | 6/1910 | France | 74/567 |
| 1168073 | 12/1958 | France | 11/1 A |
| 1183413 | 3/1970 | United Kingdom . | |
| 1190427 | 5/1970 | United Kingdom | 74/567 |
| 1378783 | 12/1974 | United Kingdom . | |
| 285000 | 8/1971 | U.S.S.R. | 74/567 |

Primary Examiner—Lawrence J. Staab
Attorney, Agent, or Firm—Steele, Gould & Fried

[57] ABSTRACT

An apparatus for driving a plurality of units, in particular processing units on paper processing machines, which are arranged on the machine in the shape of a star. To allow the drive mechanism to be constructed more simply and more cheaply, but nevertheless to maintain the synchronism, the drive is effected from a shaft via a cam, crank or eccentric drive means and an actuating rod. The actuating rod causes a pivotally mounted actuator which is common to all units to oscillate to and fro, the actuator in turn bearing cams or crank pins and driving the units via tappets or cranks. The cams can be arranged in one or more rows and can also be exchangeable.

16 Claims, 6 Drawing Figures

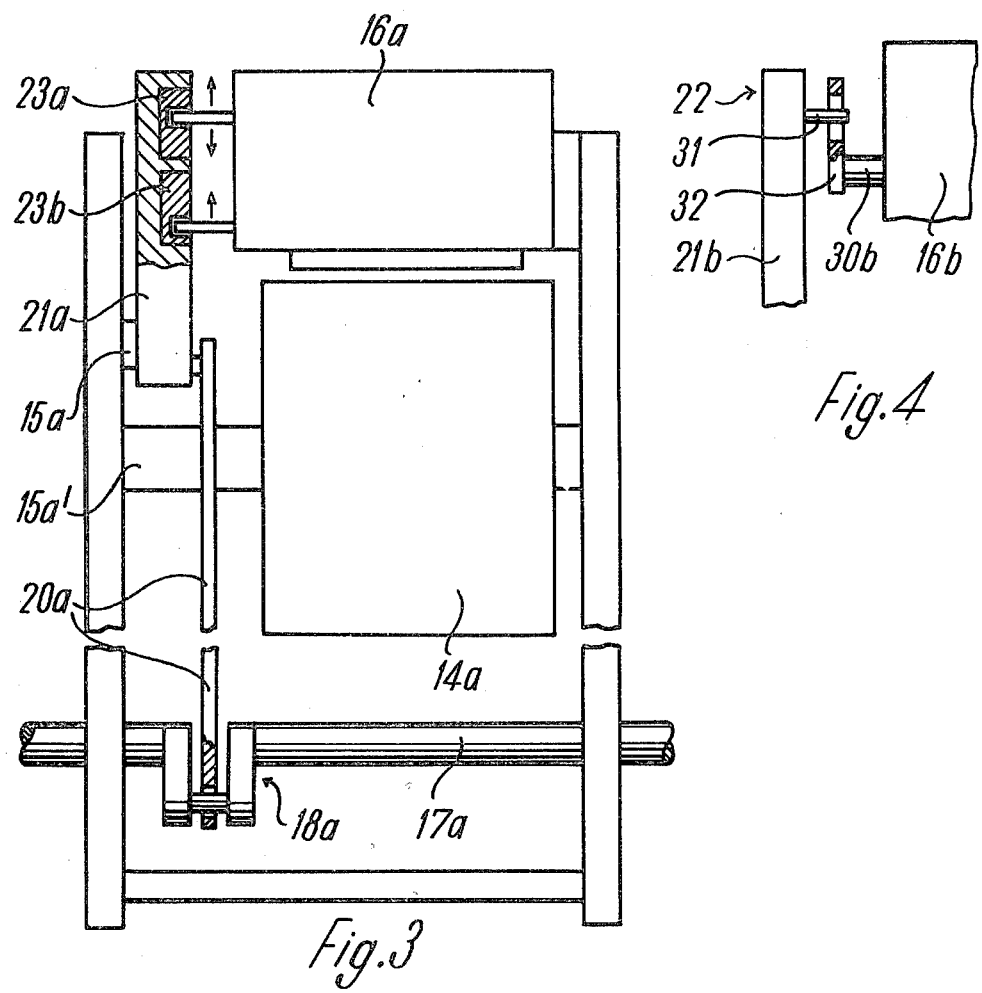
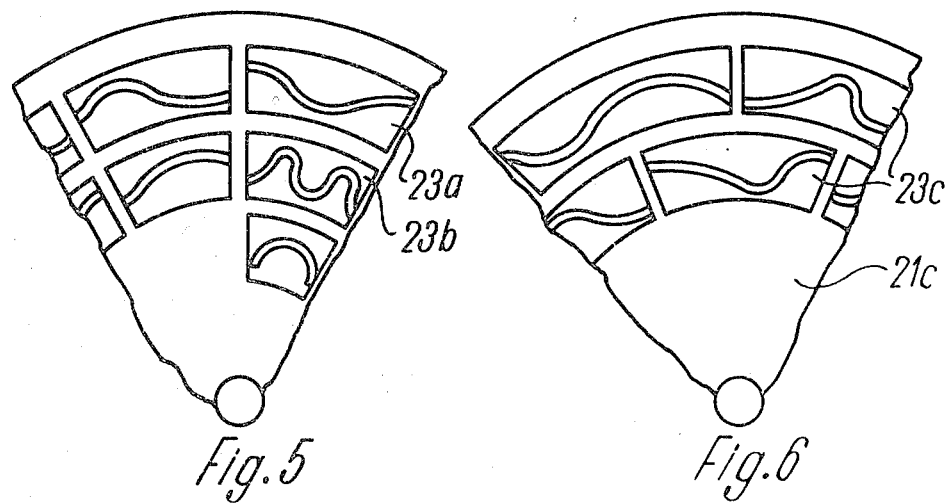

APPARATUS FOR DRIVING A PLURALITY OF UNITS

FIELD AND BACKGROUND OF THE INVENTION

The invention relates to an apparatus for driving a plurality of units which are angularly offset with respect to each other on a machine, which units can be driven by a common shaft via cam, crank or eccentric drive means. The invention relates particularly, though not exclusively to an apparatus for driving a plurality of processing units of a paper processing machine. On such machines, processing units are angularly offset with respect to each other, for example around a disc or drum in which the objects to be processed are clamped. The individual processing units are driven via a common shaft, for example the synchronous shaft of a larger processing unit which runs in a lower machine part. Each individual processing unit is provided with a cam, a crank or an eccentric which drives the unit via an actuating rod or the like. German Pat. No. 1,008,708 describes an apparatus of this type. This drive apparatus is structurally very complicated and, because there are a plurality of driving parts arranged on top of each other or next to each other, the drive apparatus is bulky and inaccessible. The relatively large moving masses give rise to considerable forces which load the drive considerably, particularly at high operating speeds.

An object of the invention is to provide an apparatus for driving a plurality of angularly offset units, which is comparatively simple in construction but allows the units to be driven precisely and synchronously.

BRIEF SUMMARY OF THE INVENTION

According to the invention there is provided an apparatus for driving a plurality of units which are angularly offset with respect to each other on a machine, comprising a rotatable shaft; cam, crank or eccentric drive means arranged on the said shaft; an actuating rod drivably connected to the said cam, crank or eccentric drive means; a pivotally mounted actuator connected to the actuating rod and arranged to execute a reciprocating oscillating movement when driven by the actuating rod; and a plurality of cam or crank drive means connected between the actuator and the units to transmit drive to the units.

The individual units can thus be driven relatively directly by the actuator which, in turn, is driven in an oscillating movement only via a single cam, crank or eccentric drive means. This has a number of advantages. Since numerous cams with an equally large number of push rods to drive the individual units are no longer needed, the number of moving parts is reduced, the size is reduced and production is cheaper. The masses moved are also reduced and the precision of the movement and the rigidity of the drive means are increased. These advantages are surprising, since it would naturally have been assumed that the interposition of an additional oscillating part would make the apparatus more complicated and the drive transmission less accurate. Another advantage lies in the fact that the synchronism of the movements between the individual units is improved considerably since the units can be driven directly by the actuator.

Other advantages and features of the invention will be apparent from the claims, the description and the drawings. Embodiments of the invention are illustrated schematically in the drawings and are described in more detail below.

BRIEF DESCRIPTION OF THE DRAWINGS

FIG. 3 shows a longitudinal section through another embodiment.

FIG. 4 shows the side view of a detail.

FIGS. 5 and 6 show a schematic view of two different embodiments of the actuator.

DETAILED DESCRITPTION OF ILLUSTRATED EMBODIMENTS

Figure 1:
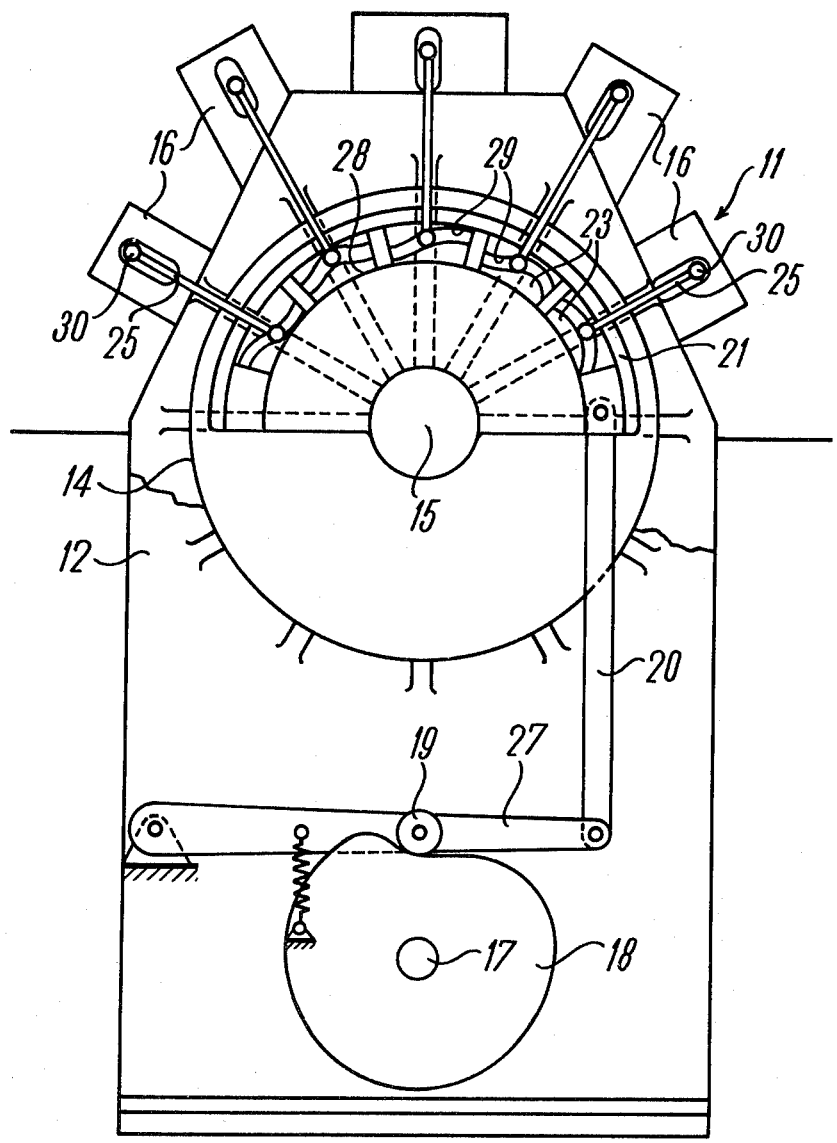
FIG. 1 shows a front view of a machine having a drive mechanism according to the invention.
Figure 2:
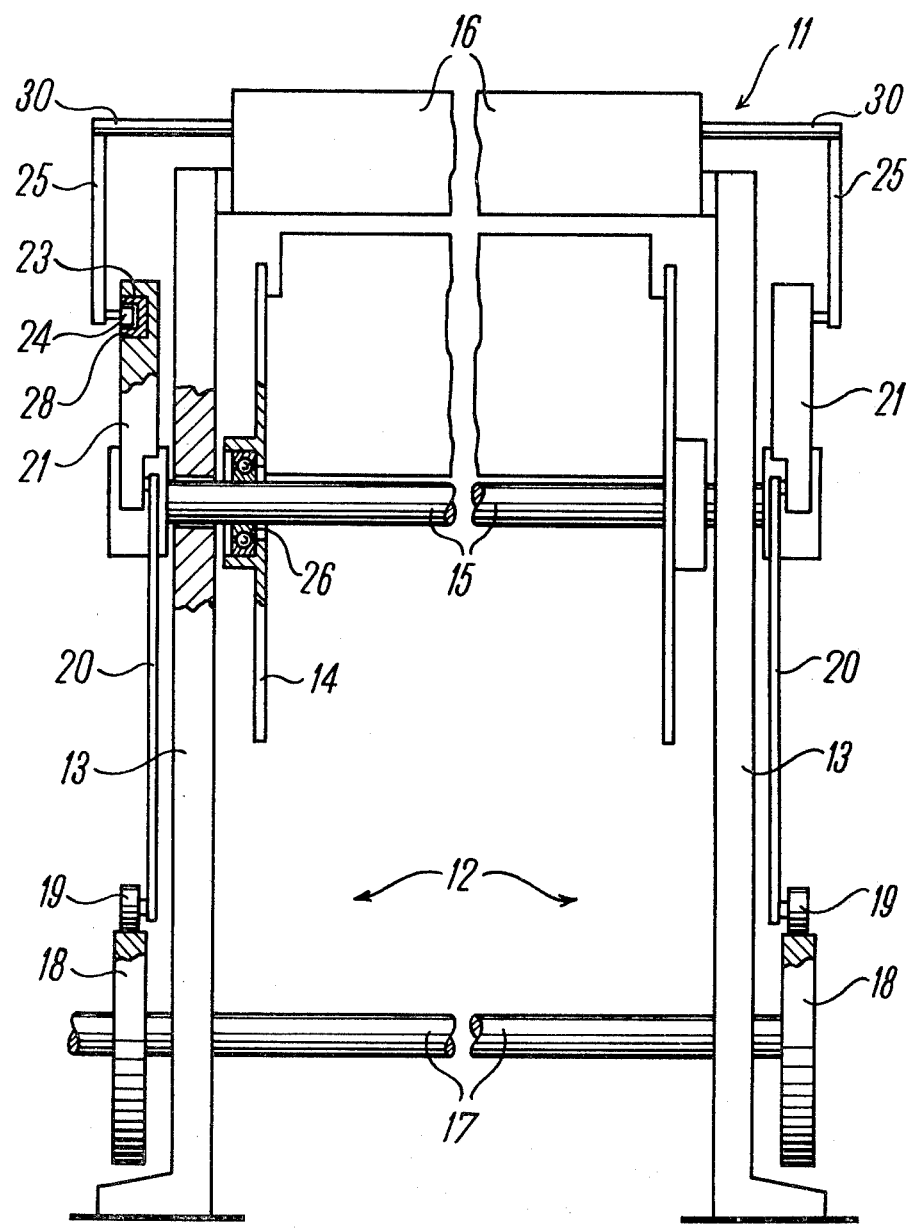
FIG. 2 shows a partial longitudinal section through a machine according to FIG. 1.

The machine 11 illustrated in FIGS. 1 and 2 can be, for example, a paper processing machine such as a machine for binding layers of sheets using a spiral binder. The machine 11 has a machine frame 12 in which a drum-like chuck 14 is mounted rotatably about a stationary shaft 15 between two side parts 13. Various stacks or layers of sheets can be clamped for processing by individual clamping tools of the chuck 14. During the rotation of the chuck about the shaft 15, they are processed in succession by processing units 16 arranged around the chuck.

The processing units 16 are arranged approximately radially with respect to the shaft 15, the units 16 being angularly offset with respect to each other on the upper part of the machine.

A horizontal shaft 17 which is parallel to the shaft 15 is arranged in the lower part of the machine frame 12 and is rotated continuously. This shaft can be the synchronous shaft of a larger processing unit to which the machine 11 belongs.

A cam 18 is arranged on each side of the lateral parts 13 on the shaft 17 and acts on a cam follower 19 arranged on a lever 27. One end of the lever 27 is mounted on a fixed pivot, and the other end carries an actuating rod 20 which grips one side of an actuator 21. The actuator 21 is arranged for pivotal movement about the shaft 15 and is in the form of a segment of a circle containing a semi-circle. Whereas the cam 18 lies in the lower part of the machine frame, the actuator 21 lies in the upper part of the machine frame in the vicinity of the processing units 16.

The actuator 21 shown in FIG. 1 has a recess in its outer plane face in the form of a circular segment with individual intermediate cross members. Cam portions 23 consisting of circular segment-shaped metal pieces are inserted into the resultant recesses 28 defined between the cross member. The metal pieces each have a groove 29 milled into them which faces the free exterior of the cam portion 23 and is adapted in shape to the requirements of the respective processing units.

Each groove 29 forms a cam which completely defines a path of movement for a cam follower 24, opposite walls of the groove engaging opposite sides of the cam follower. The cam follower is fixed on a lever 25 and mounted on an actuation shaft 30 of the respective processing unit. In the present case, two processing units 16 lying next to each other in the axial direction are each illustrated in a radial position such as can occur, for example, in length-cutting units which cut a spiral wire to length, at both ends, after the spiral wire has been twisted into a pad of sheets.

FIGS. 1 and 2 show that the chuck 14 is arranged freely rotatably on the stationary shaft 15 via a bearing 26, and the actuators 21 are also arranged freely rotatably on this shaft on each side of the machine frame and are driven independently by the two cams 18. This is advantageous if a separate drive means has in any case to be provided for the chuck 14, and processing units have to be driven with fundamentally differing drive movements on both sides. However, it is possible and advantageous for only one cam 18 to drive both actuators, for example by causing the shaft 15 to transfer the movement from one side to the other. Furthermore, it is possible for the shaft 15 to also drive the chuck 14 by providing, in addition to the bearing 26, a free wheel, for example, which ensures that the chuck 14 is reconnected during each operating cycle of the shaft 15 (to and fro oscillation).

The apparatus described above operates as follows. Due to the continuously rotating shaft 17, the cam follower 19 and thus the actuating rod 20 are moved up and down by the cam 18 and the actuator 21 oscillates by an amount which, in the present example, is somewhat smaller than a division between the processing units, i.e. corresponds approximately to the length of the individual cam portions 23. The cam follower 24 of each actuating unit is thus forcebly moved radially and thus actuates, via the lever 25, the drive shaft 30 which performs either a pivoting movement or an axial movement depending on the arrangement thereof. The shape of the cams 29 can be predetermined by the shape of the cam 18 according to the desired general path of movement. Thus, for example, prior to the cam follower 19 reaching the portion of the cam 18 with the smallest radius it has remained in a relatively long uninclined portion so that the actuator 21 remains in its position which is usually pivoted in a clockwise direction. Thereafter, the actuator is quickly pivoted in an anti-clockwise direction and then even more quickly back again. Under certain circumstances, this substantially simplifies the shape of the cams.

In the embodiment illustrated in FIG. 3, a shaft 17a which is arranged in the lower part of the machine frame has a crank 18a within the frame, the crank replacing the cam 18 of FIGS. 1 and 2. The actuating rod 20a is a connecting rod which also grips one side of an actuator 21a. The actuator 21a is mounted on a shaft 15a whereas the chuck 14a is mounted on a shaft 15a'.

In this case, the actuator 21a has two rows of cam portions 23a and 23b which lie at a radial distance from each other and which lie on the side of the actuator 21a facing the processing unit 16a and which can be moved up and down linearly independently from each other during an oscillation of the actuator.

Although the embodiment with a cam transmission from the actuator to the units is particularly preferred, a crank transmission corresponding to FIG. 4 can also be provided. In this case, one crank pin 31 which drives the drive shaft 30b of the unit 16b via a crank 32 with a slot, is arranged on the actuator 21b for each drive means 22. This embodiment can be advantageous if an oscillating movement is needed in the processing unit.

In the embodiment according to FIG. 3, two rows of cam portions 23a, 23b are superimposed on each other. According to FIG. 5, they can each correspond in length to one division between the processing units (for example be somewhat shorter). In this case, several cam followers of a processing unit are subjected simultaneously to differing movements, the right-hand processing unit having three cam followers and the left-hand processing unit having two cam followers in the example illustrated. In this arrangement, each actuator 21 makes an oscillating movement which corresponds in its angular periphery to approximately the division between the processing units.

In the embodiment according to FIG. 6, each cam portion 23c is of a length which corresponds to twice the division between two processing units. The cam portions are also arranged in two rows at a radial distance from each other but are arranged offset relative to each other so that the actuator 21c can perform an oscillating movement which is almost twice as large in its angular region as the division between the processing units. In the case of very large stroke length, this allows the cams to be less steep. The general embodiments according to FIGS. 5 and 6 can obviously also be used in combination.

It is particularly advantageous that the cam portions can be exchanged, in particular individually, but optionally also in groups, as this substantially simplifies both production and possible modification of the apparatus.

What is claimed is:

1. An apparatus for simultaneously driving a plurality of successive article processing units, comprising:
   a machine frame, the units being affixed to the frame and angularly spaced from one another with respect to a central axis;
   a drive shaft rotatably mounted to the frame;
   eccentric drive means disposed on the shaft;
   an actuating rod drivably connected to the eccentric drive means;
   an actuator pivotally mounted on the frame, connected to the actuating rod and arranged to reciprocate when driven by the actuating rod; and,
   a plurality of respective cam means on the actuator for independently driving each of the units by movements transverse to movement of the actuator, whereby articles are successively processed in simultaneous operations of the different units.

2. An apparatus according to claim 1, wherein the rotatable drive shaft is arranged in a lower portion of the machine frame and the actuator is mounted for pivotal movement about a second shaft disposed on the central axis defined by the units.

3. An apparatus according to claim 1, wherein the second shaft is concentric with a rotatable chuck for the articles to be processed, around which the units are arranged.

4. An apparatus according to claim 1, wherein the actuator drives the units directly.

5. An apparatus according to claim 1, wherein the cam means comprises cam portions on the actuator which cooperate with cam followers on the units.

6. An apparatus according to claim 5, wherein the cam portions are cams which define a path of movement for the cam followers on both sides of the cam followers.

7. An apparatus according to claim 1, wherein the actuator is shaped substantially like a segment of a circle.

8. An apparatus according to claim 5, wherein the cam portions are arranged along an arc of a circle.

9. An apparatus according to claim 5, wherein any one of the cam portions associated with any one of the units is interchangeable without effecting operation of any other of the units.

10. An apparatus according to claim 5, wherein the cam portions are arranged on the actuator at differing radial intervals with respect to the central axis.

11. An apparatus according to claim 5, wherein at least some of the cam portions overlap one another.

12. An apparatus according to claim 5, wherein a plurality of the cam portions are allocated to one of the units.

13. An apparatus according to claim 1, comprising means for rotatably driving an additional machine part from the reciprocation of the actuator.

14. An apparatus according to claim 13, wherein the additional machine part is a chuck for holding the articles to be processed.

15. An arrangement comprising a plurality of apparatuses according to claim 1, arranged on the same machine frame.

16. An arrangement according to claim 15, wherein there are two apparatuses arranged on opposite sides of the machine frame.

* * * * *

UNITED STATES PATENT AND TRADEMARK OFFICE
CERTIFICATE OF CORRECTION

PATENT NO. : 4,300,406
DATED : November 17, 1981
INVENTOR(S) : GUIDO NEGRO ET AL It is certified that error appears in the above-identified patent and that said Letters Patent are hereby corrected as shown below:

At column 2, line 15, delete "DESCRITPTION" and insert --DESCRIPTION--.

At column 3, line 26, delete "forcebly" and insert --forceably--.

At column 4, line 67 (Claim 9, line 3), delete "effecting" and insert --affecting--.

Signed and Sealed this

Second Day of February 1982

|SEAL|

*Attest:*

*Attesting Officer*

GERALD J. MOSSINGHOFF

*Commissioner of Patents and Trademarks*